June 8, 1943.  H. ULANET  2,321,338
ADJUSTABLE THERMOSTAT
Filed Jan. 3, 1942
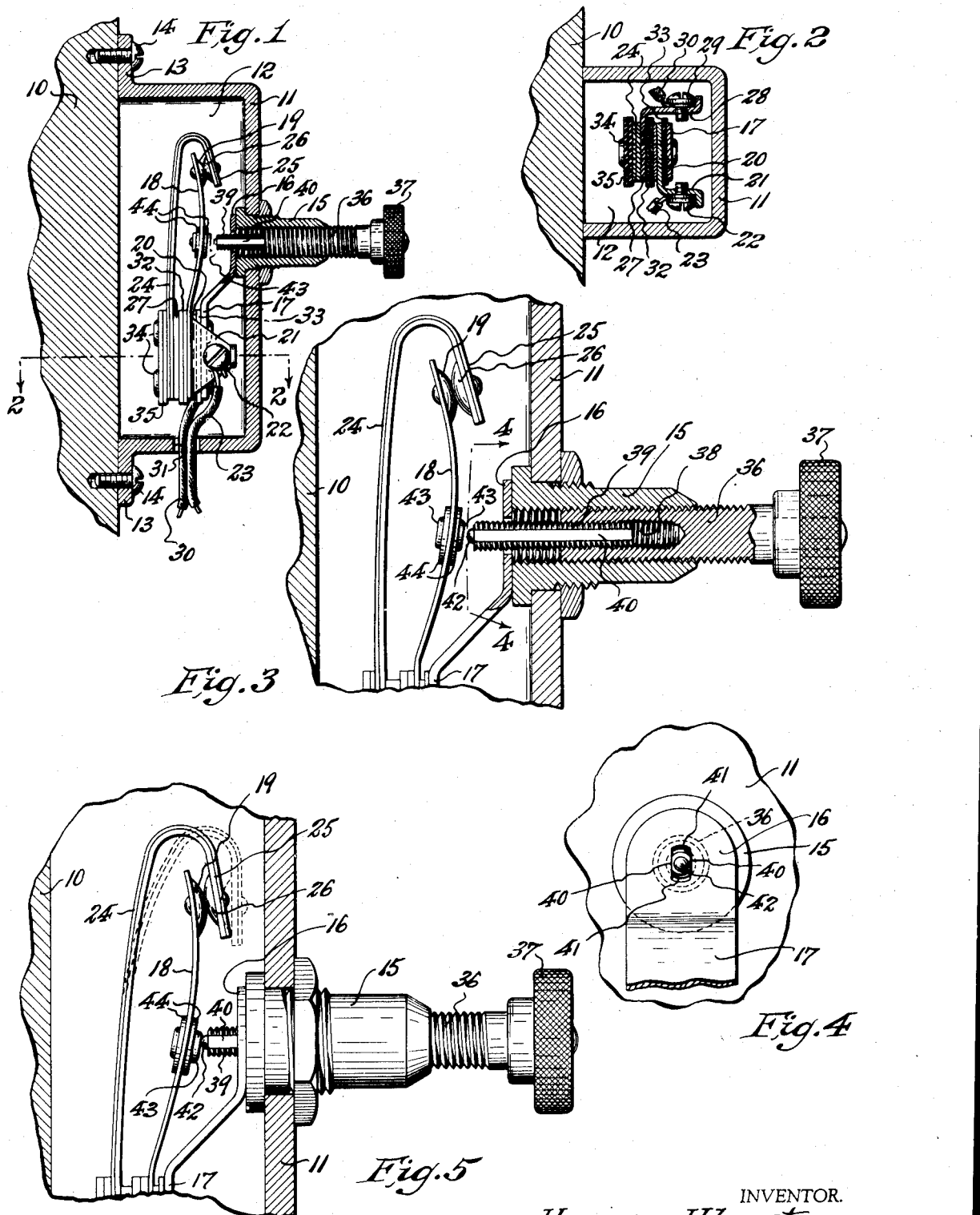
INVENTOR.
Herman Ulanet,
BY George D. Richards
ATTORNEY.

Patented June 8, 1943

2,321,338

UNITED STATES PATENT OFFICE 2,321,338

ADJUSTABLE THERMOSTAT

Herman Ulanet, Newark, N. J.

Application January 3, 1942, Serial No. 425,505

2 Claims. (Cl. 200—138)

This invention relates to improvements in electric circuit control thermostats; and the invention has reference, more particularly, to a novel construction of adjustable thermostat.

This invention has for an object to provide an electric circuit control thermostat having novel means for adjusting the same, whereby to so regulate its operation that the electric circuit controlled thereby will be opened or closed, as the case may be, at a desired specific temperature within a minimum temperature differential, such "temperature differential" being the difference in temperature between the opening and closing of the thermostat contacts, thereby to provide an exceedingly close temperature control of equipment or a part thereof which is served by the thermostat.

The invention has for another object to provide in combination with a thermostatic element controlled electrical make and break contact means, a novel compound adjusting screw means, operation of the cooperating members of which will provide either a deductive or additive, as the case may be, resultant linear movement of very precise desired degree, whereby the moment of circuit make or break of said contact means may be very precisely predetermined to occur substantially at a desired temperature degree.

The invention has for a further object to provide in an electric circuit control thermostat a compound adjusting screw adapted to attain a very delicate degree of adjustment effect, the members of which may be of comparatively coarsely threaded standard pitch, thus eliminating necessity for employing screw means of fine thread and pitch which are easily battered, stripped or otherwise injured to the detriment or defeat of its desired functional operation.

Other objects of this invention, not at this time more particularly enumerated, will be understood from the following detailed description of the same.

An illustrative embodiment of this invention is shown in the accompanying drawing, in which:

Fig. 1 is a sectional view of a thermostat made according to this invention, with the thermostatic element controlled electrical make and break contact means and the compound adjusting screw means therefor shown in elevation; and Fig. 2 is a horizontal sectional view, taken on line 2—2 in Fig. 1.

Fig. 3 is a fragmentary enlarged view similar to that of Fig. 1, but showing the external member of the compound adjusting screw in part longitudinal section and the internal member thereof in elevation; Fig. 4 is a fragmentary transverse vertical section, taken on line 4—4 in Fig. 3; and Fig. 5 is a fragmentary view similar to that of Fig. 3, but showing the compound adjusting screw means and its support in elevation, this view showing the operative effect of the latter in predetermining the moment of contact break.

Similar characters of reference are employed in the above described views, to indicate corresponding parts.

Referring to the drawing, the reference character 10 indicates a suitably heated body to which the adjustable thermostat of this invention is operatively attached for the control of the temperature thereof.

In the illustrative form thereof shown, the thermostat comprises an open bottomed casing 11 to provide an internal chamber 12 within which the thermostatic element controlled electrical make and break contact means is housed. Said casing 11 is provided with external perforate anchoring legs 13 in the plane of its open bottom, whereby, when the casing is applied to the heated body 10 to be served by the thermostat, the same may be secured thereto by fastening screws 14. Any other suitable manner and means of mounting the thermostat in the place of service may be optionally employed.

Suitably affixed to a wall of the casing 11, to project externally therethrough, is an internally screw-threaded bushing 15. Affixed to the inner end of said bushing is bracket member 16, the inwardly offset end portion 17 of which serves to support the thermostatic element controlled electrical make and break contact means and the electrical circuit connections therefor.

The thermostatic element controlled electrical make and break contact means, in an illustrative form thereof as shown, includes an electrically conductive resilient or spring arm 18, upon the free end portion of which is mounted a contact piece 19. The base of said spring arm 18 is mechanically affixed to and in electrical contact with a conductive base plate 20, from one end or side of which angularly extends a connector portion 21 through which is engaged a binding screw 22, by means of which one electrical circuit wire 23 may be secured in electrically connected relation to said connector portion 21. Provided for cooperation with said arm 18 and its contact piece 19 is a bi-metallic thermostatic element 24, the free end portion of which is bent back upon itself to provide a contact carrier portion 25 to oppose the free end portion of said arm 18. Upon the carrier portion 25 of the thermostatic element is mounted a contact piece 26 for opposition to and engagement with said contact piece 19 of the arm 18. The base of said thermostatic element 24 is mechanically affixed to and in electrical contact with a second conductive base plate 27, from one end or side of which angularly extends a connector portion 28 through which is engaged a binding screw 29, by means of which the other electrical circuit wire 30 may be secured in electrically connected relation to said connector portion 28. A wall of the casing 11 is provided with a suitably located opening 31 through which said circuit wires 23 and 30 may pass into the interior chamber 12 of said casing for described connection with the thermostatic element controlled make and break contact means. The base of the arm 18 and its supporting base plate 20 is insulated from the base of the thermostatic element 24 and its supporting base plate 27 by interposed electrical insulation 32, and, in like manner, the base plate 20 is insulated from the offset end portion 17 of the carrying bracket member 16 by interposed electrical insulation 33. The described parts are secured in assembled relation and to said end portion 17 of the carrying bracket member 16 by fastening rivets 34, which are insulated therefrom by electrical insulation including the layers of insulating material 35.

The spring arm 18 of the make and break contact means is disposed in opposed spaced relation to the inner end of the bushing 15 which mounts the thermostat adjusting screw means. Said adjusting screw means comprises an external screw member 36 the external threads of which turn in the internally screw-threaded bore of the bushing 15. Affixed to the outer end of said external screw member 36 is a finger-piece 37 by which the same may be manipulated. Said internal screw member 36 is provided with an internally screw-threaded bore 38, extending axially thereinto from its inner end. Engaged by its external threads in said screw-threaded bore 38 of the external screw member 36 is an internal screw member 39. The free end portion of said internal screw member extends through the bracket member 16 into the interior chamber 12 of the casing 11 and toward the spring arm 18 of the make and break contact means. Any suitable means is provided to prevent rotation of said internal screw member 39, so that the same may be caused to move linearly under the impulsion of its screw-threaded connection with said external screw member 36, when the latter is rotated. Illustrative of one means effective for such purpose, as shown, one or both sides of said internal screw member 39 is cut away to provide flat bearing or guide face or faces 40, and the opening in the bracket member 16, through which said internal screw member projects, is shaped to provide straight side or sides 41 which said bearing or guide face or faces slidingly engage, whereby to permit the desired linear movement of said internal screw member 39 without accompanying rotation. The extremity of said internal screw member 39 serves as a stop abutment engageable by the spring arm 18 of the make and break contact means, and, if desired, may be suitably formed to serve such purpose, as by the provision of a rounded stop boss 42, as shown. Suitably mounted on said spring arm 18 is an abutment piece 43 to engage the stop boss 42 at proper times. Said abutment piece 43 is suitably insulated from electrical contact with the spring arm 18 by interposed insulating elements 44.

In the operation of the make and break contact means, when the same is of the normally closed type adapted to open under rise of temperature, the moment of break is normally determined by the amplitude of tensional relaxation of the spring arm 18, when the bi-metallic thermostat element is flexed and displaced therefrom by the expansive effect of heat upon said thermostatic element. If the tensional relaxation of said spring arm is opposed at any point short of its normal amplitude of relaxing movement, the moment of break may be advanced, so that the controlled circuit will be interrupted at a lower maximum temperature, or, in other words, by a lower degree of the heat applied to the thermostatic element. To adjust the effective degree of tensional relaxation of the spring arm 18 is the function of the adjusting screwmeans.

Since, in the use of thermostats, it is frequently desirable that very delicate and minute regulation thereof be attainable for a precise determination of the moment of break in response to a desired degree of applied heat within a very small or close range of differential temperature, an adjusting screw arrangement capable of minute linear adjusting movement is required. To some extent such requirement could be met by a single adjusting screw of very fine thread and pitch, but use of a screw of such character is not altogether satisfactory for the reason that its delicate thread structure is relatively costly to produce, but beyond this, such delicate thread structure is easily battered, stripped or otherwise injured to the detriment or even defeat of its required operation. To overcome this, the instant invention provides a novel compound adjustment screw means which is capable of very minute linear adjusting movement, so as to facilitate accurate calibration of the thermostat action, and yet permits use of screw threads of comparatively coarse structure and pitch. In the compound adjusting screw means of this invention, the external screw member 36 may be comparatively coarsely threaded, say e. g. twenty-eight threads to the inch, and the internal screw member 39 may be likewise comparatively coarsely threaded, say of lesser pitch e. g. thirty-two threads to the inch. Threads of such size are strong and not easily injured.

In the operation of the compound adjusting screw means, assuming that the threads of both the external and internal screw-members are either right hand or left hand threads, the inturning of the external screw member 36 advances the compound screw assembly as a whole, but, since the internal screw member 39 is held against turning, the same is driven linearly by the internal threads of the rotated external screw member. The linear motion thus imparted to the internal screw member 39 is retractive, i. e. in direction opposite to the ingoing movement of the external screw member 36, and by reason of the pitch differential between the external and internal screw members, the retractive movement of the latter produces a deductive effect upon the advance of the screw assembly as a whole. As a consequence of this, a very minute and delicately adjusted spaced relation of the stop boss 42 relative to the abutment piece 43 of the spring arm 18 of the make and break contact means may be easily and quickly attained.

In some cases, it may be desirable that the compound adjusting screw be capable of an additive linear movement effect rather than the deductive linear movement effect above described. If so, such additive effect may be attained by making one of the screw members of right hand threaded structure and the other of left hand threaded structure.

It will be understood that the pitch differential between the external and internal screw members is subject to a considerable range of selective variation, according to the size and type of thermostat structure in which it is to be cooperatively incorporated.

It will also be understood, that the thermostatic element may be heated by heat radiated from the body served by the thermostat, as shown in the drawing, or the same may be arranged to be heated by the conduction of electrical energy therethrough, all according to the specific use which the thermostat is to serve in any given case.

Again, it will also be understood that the specific form of the thermostatic element controlled make the break contact means is likewise subject to considerable variation, and may be arranged for operation with normally closed contacts adapted to open on rise of temperature, or with normally open contacts adapted to close on rise of temperature.

Having now described my invention, I claim:

1. A thermostat comprising a support, an internally screw-threaded bushing extending through said support, a bracket affixed to the inner end of said bushing, a bi-metallic thermostatic element having at its free end portion a contact means, a resilient element having at its free end portion a contact means in opposition to said thermostatic element contact means for make and break relation thereto, a conductor attachment means in electrical contact with the lower end portion of said thermostatic element, a conductor attachment means in electrical contact with the lower end portion of said resilient element, means to affix said elements and their conductor attachment means to said bracket in insulated relation thereto and to each other, said resilient element being disposed in spaced away aligned opposition to the inner end of said bushing, an adjusting screw means to provide a stop for limiting flexional movement of said resilient element, said adjusting screw means comprising an external screw member threaded into said bushing through its outer end, said external screw member having an internally screw-threaded bore, an internal screw member externally screw-threaded to engage said internally threaded bore of said external screw member, the free end of said internal screw member projecting from the inner end of said bushing and through said bracket for opposition to said resilient element, and said bracket and internal screw member having cooperative means to prevent rotation of the latter.

2. A thermostat comprising a support, an internally screw-threaded bushing extending through said support, a bracket affixed to the inner end of said bushing, a bi-metallic thermostatic element having at its free end portion a contact means, a resilient element having at its free end portion a contact means in opposition to said thermostatic element contact means for make and break relation thereto, a conductor attachment means in electrical contact with the lower end portion of said thermostatic element, a conductor attachment means in electrical contact with the lower end portion of said resilient element, means to affix said elements and their conductor attachment means to said bracket in insulated relation thereto and to each other, said resilient element being disposed in spaced away aligned opposition to the inner end of said bushing, and adjusting screw means to provide a stop for limiting flexional movement of said resilient element, said adjusting screw means comprising an external screw member threaded into said bushing through its outer end, said external screw member having an internally screw-threaded bore, an internal screw member externally screw-threaded to engage said internally threaded bore of said external screw member, the free end of said internal screw-member projecting from the inner end of said bushing and through said bracket for opposition to said resilient element, said bracket and internal screw member having cooperative means to prevent rotation of the latter, and said resilient element having abutment means electrically insulated therefrom and engageable by said internal screw member.

HERMAN ULANET.